(12) United States Patent
Mathew et al.

(10) Patent No.: US 9,114,337 B2
(45) Date of Patent: Aug. 25, 2015

(54) DEVICE AND IMPLEMENTATION FOR FILTERING OIL FROM WATER IN AN APPLIANCE

(75) Inventors: Paul Mathew, Bangalore (IN); Ramasamy Thiyagarajan, Louisville, KY (US); Nikhil Subhashchandra Tambe, Bangalore (IN); Duraiswamy Srinivasan, Bangalore (IN)

(73) Assignee: General Electric Company, Schenectady, NY (US)

( * ) Notice: Subject to any disclaimer, the term of this patent is extended or adjusted under 35 U.S.C. 154(b) by 1003 days.

(21) Appl. No.: 13/186,687

(22) Filed: Jul. 20, 2011

(65) Prior Publication Data

US 2013/0020240 A1 Jan. 24, 2013

(51) Int. Cl.
*A47L 15/42* (2006.01)
*B01D 39/00* (2006.01)

(52) U.S. Cl.
CPC ............. *B01D 39/00* (2013.01); *A47L 15/4204* (2013.01); *B01D 2239/0421* (2013.01); *B01D 2239/0428* (2013.01); *B01D 2239/065* (2013.01)

(58) Field of Classification Search
None
See application file for complete search history.

(56) References Cited

U.S. PATENT DOCUMENTS

| 3,542,594 | A | * | 11/1970 | Faust et al. | 134/25.2 |
|---|---|---|---|---|---|
| 4,131,546 | A | * | 12/1978 | Olsson et al. | 210/771 |
| 4,356,090 | A | * | 10/1982 | Tran | 210/350 |
| 4,497,707 | A | * | 2/1985 | Anderson | 210/136 |
| 6,010,621 | A | | 1/2000 | Pattee | |
| 2003/0111403 | A1 | * | 6/2003 | Zia | 210/436 |
| 2011/0146714 | A1 | * | 6/2011 | Fountain et al. | 134/10 |

FOREIGN PATENT DOCUMENTS

| GB | 2413335 A | | 10/2005 |
|---|---|---|---|
| JP | 2007175567 A | * | 7/2007 |
| WO | WO 2012083485 A1 | * | 6/2012 |

* cited by examiner

*Primary Examiner* — Terry Cecil
(74) *Attorney, Agent, or Firm* — Dority & Manning, P.A.

(57) ABSTRACT

An appliance for washing objects is disclosed that effectively and energy-efficiently filters oil-based residue from a fluid such as washing fluid that drains from a basin in the appliance. In one illustrative embodiment, an appliance includes a novel filter assembly for filtering oil-based residue out of the washing fluid. The filter assembly includes a filter layer composed of a material that is both oleophilic and hydrophobic. The filter assembly forms part of a fluid distribution system that has different configurations. A first configuration allows for recirculating filtered wash fluid from an outlet of the filter assembly back into the basin of the appliance. A second configuration allows for draining both the washing fluid from the outlet of the filter assembly and the oil-based residue from a bypass zone of the filter assembly to an appliance outlet.

18 Claims, 6 Drawing Sheets

DEVICE AND IMPLEMENTATION FOR FILTERING OIL FROM WATER IN AN APPLIANCE

BACKGROUND

1. Field of the Invention

The subject matter disclosed herein relates generally to appliances, and more particularly to embodiments of an appliance configured to filter a fluid (e.g., water).

2. Description of Related Art

Appliances such as household dishwashers operate by way of several fill and drain cycles. During each of these cycles, washing fluid such as water flows into the appliance, heats to a pre-set temperature, mixes with a detergent, and then circulates in a manner that cleans the objects (e.g., dishes, dishware, etc.) disposed therein. The hot washing fluid, with a mixture of water and detergent, cleans residue from the objects. The residue typically includes some oil-based materials, including grease and fat. These oils mix in with the washing fluid, and reduce the efficiency of subsequent processes such as further cleaning of the objects. During the cleaning cycle, the washing fluid is typically circulated through a filter, to separate out residue materials including oils, so that it may be re-applied to the objects and perform further cleaning. When the cleaning cycle is complete, the washing fluid drains from the appliance.

Separating oil from water is sometimes performed by mechanical means, using centrifugal force. Such methods require a capital investment for the mechanical structures, and requires significant energy consumption. Some methods also use chemical additives or surfactants for separating oil from water. These methods typically necessitate additional processes for later removing the chemical additives or surfactants from the water. Some methods for filtering water include the use of reverse osmosis, which also requires significant energy consumption.

The inventors have perceived that it would be advantageous to configure an appliance to provide reduced energy consumption and capital cost while still effectively filtering oil from water.

BRIEF DESCRIPTION OF THE INVENTION

An appliance for washing objects is disclosed that effectively and energy-efficiently filters oil-based residue from a fluid such as washing fluid that drains from a basin in the appliance. In one illustrative embodiment, an appliance includes a novel filter assembly for filtering oil-based residue out of the washing fluid. The filter assembly includes a filter layer composed of a material that is both oleophilic and hydrophobic. The filter assembly forms part of a fluid distribution system that has different configurations. A first configuration allows for recirculating filtered wash fluid from an outlet of the filter assembly back into the basin of the appliance. A second configuration allows for draining both the washing fluid from the outlet of the filter assembly and the oil-based residue from a bypass zone of the filter assembly to an appliance outlet.

BRIEF DESCRIPTION OF THE SEVERAL VIEWS OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Discussed in more detail below are devices and apparatuses, such as filtering devices and appliances for washing objects (e.g., dishes, dishware, and articles of clothing) that have filtering components, which incorporate advantageous concepts and features for filtering fluids, such as for filtering oil from a water-based solution. Illustrative advantages of these concepts include filtering fluids, such as filtering oil from water, in ways that require low capital cost and low energy consumption.

Figure 1A:
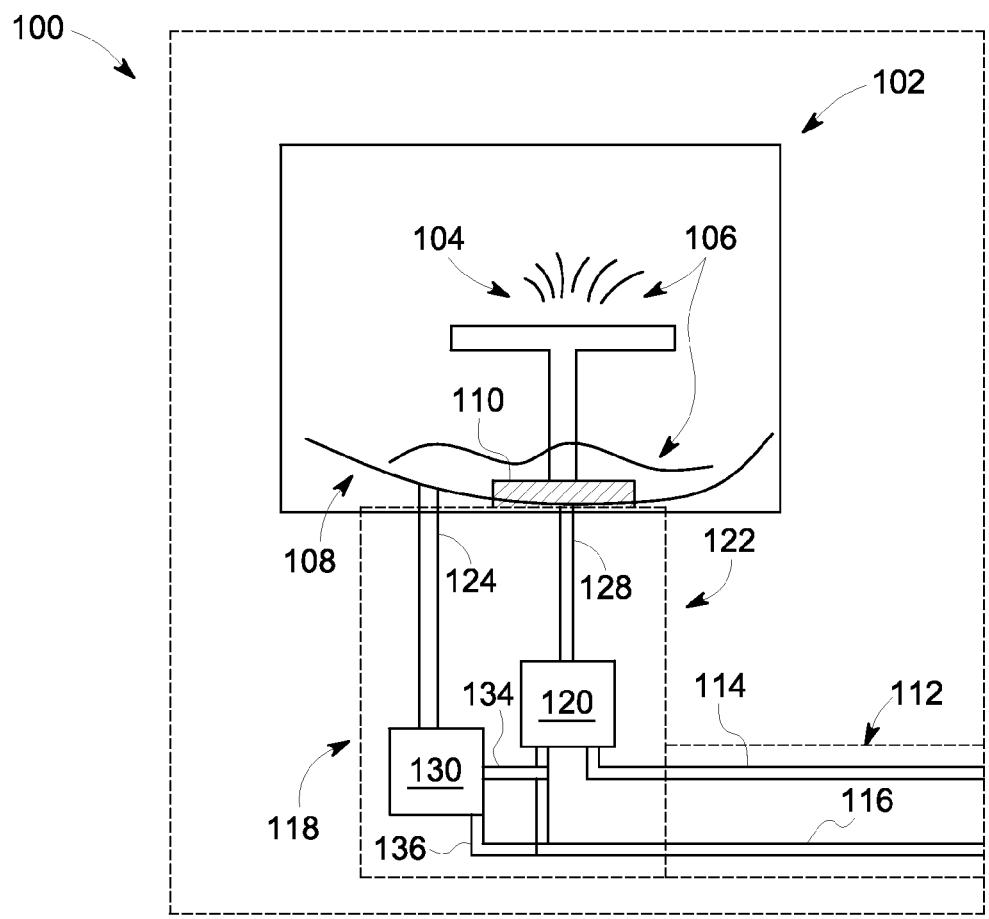
FIG. 1A is a schematic diagram of an illustrative embodiment of an appliance for washing objects.

FIG. 1A depicts an exemplary embodiment of an appliance 100 that includes an enclosure 102 and a spray system 104 for dispensing a fluid 106, which may be washing fluid, for example. In one embodiment, the appliance 100 is a dishwasher. In another embodiment, the appliance 100 is a clothes washer, or "washing machine". The enclosure 102 has a basin 108 and a heating element 110, which heats the fluid 106. This combination may be used to apply fluid 106 for cleaning soiled objects (not shown) in the appliance 100. The objects can include dishware, washed in a dishwasher, as well as articles of clothing washed in a washing machine. An inlet/outlet 112 permits ingress and egress of fluid into and out of the appliance 100. The inlet/outlet 112 comprises an appliance inlet 114, which serves as a fluid inlet to appliance 100 and may be coupled to, for example, a municipal water supply that may provide water, which, after entering the appliance 100, may have detergent mixed in with it to form a washing fluid. Inlet/outlet 112 also comprises an appliance outlet 116, which serves as a fluid outlet to appliance 100 and may be secured to drainage or other means for disposing of wastewater, which may be formed from washing fluid mixed with residue, oils, and other waste products.

The appliance 100 is also equipped with a fluid distribution system 118, which is coupled to the spray system 104, the basin 108, the appliance inlet 114, and the appliance outlet 116. In the illustrative embodiment of FIG. 1A, the fluid distribution system 118 includes a pump 120 that is used to pressurize and distribute the fluid 106 such as from the basin 108 to the spray system 104. The pump 120 is coupled to a conduit matrix 122 that is constructed of tubes, pipes, fittings, valves, and related elements that are useful to transport fluids such as the fluid 106. The conduit matrix 122 is configured with a filter inlet 124 that is coupled to the basin 108 and serves as a basin drain for basin 108. The conduit matrix 122 is also configured with a spray inlet 128 that is coupled between the pump 120 and the spray system 104.

Coupled to the filter inlet 124 is a filter assembly 130, which is in flow communication with the enclosure 102 through filter inlet 124. Filter assembly 130 may illustratively be positioned in a drain chamber or cavity formed below basin 108 or in fluid communication with basin 108. Filter assembly 130 may illustratively include filter elements particularly useful for separating oils from an incoming water-based fluid such as fluid 106, which may illustratively be a washing fluid carrying oils and other waste and residue from within enclosure 102. These filter elements are further described below in connection with various illustrative embodiments. Filter assembly 130 may also include, or be accompanied by, other filter elements specifically directed to various other filtering tasks in addition to filtering oils from the fluid 106.

Referring again to FIG. 1A, filter assembly 130 is in fluid connection with a first outlet 134 and a bypass zone 136. First outlet 134 serves as an outlet for wash fluid that has been filtered of oil-based substance, while bypass zone 136 serves as an outlet for the oil-based substance that has been filtered out from the wash fluid. This is explained more in reference to FIG. 2 below. The first outlet 134 provides a fluid connection from the filter assembly 130 to the pump 120, the spray inlet 128, and the spray system 104, thereby permitting fluid flow from first outlet 134 to basin 108, when fluid distribution system 118 is in a first configuration, such as during a wash cycle. The filter assembly 130 also has the bypass zone 136. The first outlet 134 and bypass zone 136 may both be fluidly connected to appliance outlet 116. When fluid distribution system 118 is in a second configuration, such as during a rinse or drain cycle, fluid distribution system 118 may permit fluid flow from both first outlet 134 and bypass zone 136 to appliance outlet 116.

Figure 1B:
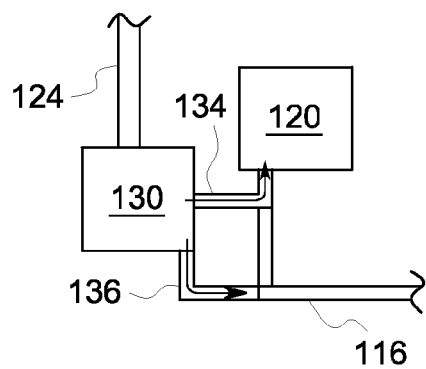
FIG. 1B is a schematic diagram of an illustrative embodiment of a first configuration for fluid flow in and around a filter assembly in the appliance of FIG. 1A.
Figure 1C:
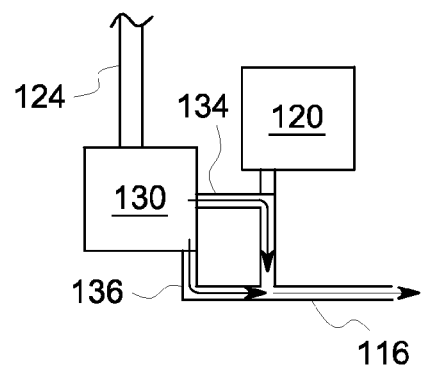
FIG. 1C is a schematic diagram of an illustrative embodiment of a second configuration for fluid flow in and around a filter assembly in the appliance of FIG. 1A.

FIG. 1B illustrates the first configuration, in which the first outlet 134 provides an open connection for fluid to flow from the filter assembly 130 to the pump 120. At the same time, fluid entering the bypass zone 136 remains there. FIG. 1C illustrates the second configuration, in which both the first outlet 134 and the bypass zone 136 provide open connections for fluid to flow from the filter assembly 130 to the appliance outlet 116.

Figure 2:
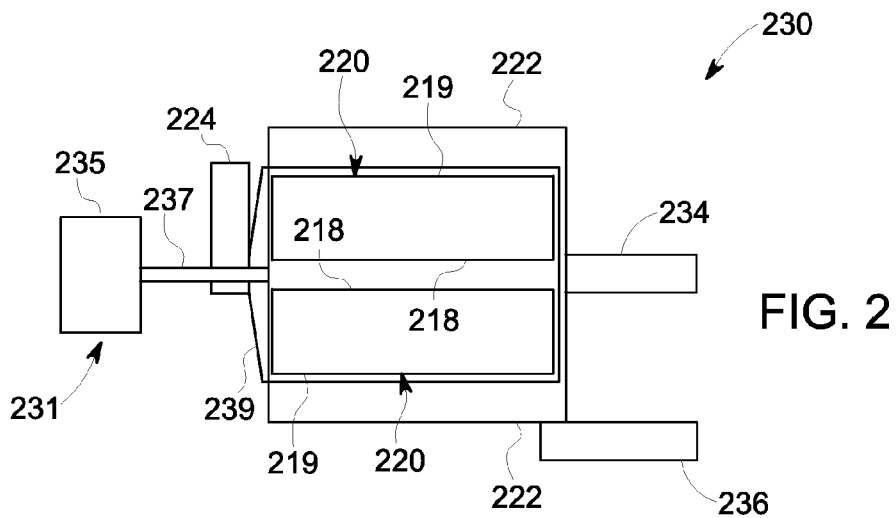
FIG. 2 is a cutaway side plan view of an illustrative embodiment of a filter assembly.

FIG. 2 is a cutaway side plan view of a filter assembly 230, in accordance with one illustrative embodiment having a cylindrical form, as viewed from the side, perpendicular to the cylindrical axis. The filter assembly 230 is one example of the filter assembly 130 of FIG. 1A, with like components being designated by reference numbers that have increased by 100.

In FIG. 2, the filter assembly 230 has a filter inlet 224, a first filter layer 220 (seen in cross-section), a first outlet 234, a bypass zone 222, and a bypass outlet 236. First filter layer 220 is formed in a cylindrical, annular shape in this illustrative embodiment, defining an interior fluid path between filter inlet 224 and first outlet 234, while bypass zone 222 occupies the annular region outside of cylindrical first filter layer 220 but interior to an outer cylindrical wall. The first filter layer 220 has a first side 218 and a second side 219. The first side 218 forms the cylindrical interior side of the first filter layer 220, such that the first outlet 234 is in fluid connection with the first side 218 of the filter layer 220. The second side 219 forms the cylindrical exterior side of the first filter layer 220, such that the bypass zone 222 is in fluid connection with the second side 219 of the filter layer. Filter inlet 224 is coupled to a basin such as basin 108 in FIG. 1A, and first filter layer 220 is in fluid connection with the filter inlet 224.

First filter layer 220 may illustratively be at least partially surrounded by a structural scaffold such as a mesh cover, which may be composed of nylon, aluminum, steel, plastic, or any other suitable material. First outlet 234 is fluidly connected with a fluid path from filter inlet 224 and internal to the first filter layer 220, while bypass zone 222 is separated from filter inlet 224 by first filter layer 220. In this way, the first outlet 234 is in fluid connection with the filter inlet 224 in a fluid path that passes across the first filter layer 220, and is in fluid connection with the first side 218 of the first filter layer 220. The bypass zone 222 is in fluid connection with the filter inlet 224 in a fluid path that passes through the first filter layer 220, and is in fluid connection with the second side 219 of the first filter layer 220. In this way, because first filter layer 220 is both oleophilic and hydrophobic, oil-based substances tend to be absorbed into first filter layer 220 and pass through it to bypass zone 222, while water-based fluid tends to pass across first filter layer 220 to first outlet 234.

In use, for example, fluid 106 may flow from basin 108 through filter inlet 124 as a washing fluid with waste residue mixed in. The waste residue may for example contain substantial amounts of oil-based matter, such as grease and food oils, which may be more or less broken down by the hot wash fluid and detergent contained therein. The first filter layer 220 may absorb much of these oils from the fluid 106, while at the same time repelling water, so that fluid 106 may emerge from filter assembly 230 as a renewed wash fluid, largely cleansed of oil-based residue. Fluid 106 may then be re-sent through spray system 104 to be re-used for washing the articles contained within enclosure 102. Meanwhile, the oils absorbed out of fluid 106 in first filter layer 220 may remain in first filter layer 220, and/or may collect outside first filter layer 220 in bypass zone 222, and may exit filter assembly 230 through a separate outlet, bypass outlet 236, which is not redirected to spray system 104 or enclosure 102. During a drain cycle at the end of a wash cycle or a rinse cycle, the contents of bypass zone 222 may be drained out from an appliance without ever being re-directed back into enclosure 102. Bypass outlet 236 provides a fluid outlet to bypass zone 222. In other embodiments, a bypass outlet may itself serve as the bypass zone, and no separate upstream bypass zone may be used in such types of embodiments. In various other embodiments, a bypass outlet may lead to a separate bypass circuit without any separate bypass zone within the filter assembly. The bypass circuit itself may serve as the bypass zone, exterior to the main body of the filter assembly. The bypass outlet and/or the bypass circuit may be considered to be the bypass zone, and may be considered to be part of the greater filter assembly, without being part of the main body of the filter assembly, for example.

First filter layer 220 comprises a material that is both oleophilic and hydrophobic, so that it absorbs oils from the fluid 106 while repelling water. As illustrative examples of first filter layer 220 comprising a material that is both oleophilic and hydrophobic, first filter layer 220 may illustratively be composed of any one or more of kapok, polyphylene sulphide, fluorosilicone, and polystyrene, or combinations of these and or other materials. For instance, first filter layer 220 may illustratively include a combination such as polystyrene-coated polyphylene sulphide, as an example. Different oleophilic and hydrophobic materials may also be stacked in layers for multiple filter materials, such as a fluorosilicone layer, followed by a polyphylene sulphide layer, and then a kapok layer, in an illustrative embodiment. Different embodiments may be similar to that of FIG. 2 except for including multiple layers of filter materials where the embodiment of FIG. 2 includes first filter layer 220, for example. In another illustrative embodiment, first filter layer 220 may be composed of a single material, such as kapok.

In experimental testing on one illustrative embodiment, a filter device conforming to the embodiment of FIG. 2 was experimentally tested with various amounts of kapok fiber. In the embodiment in this test, the inner chamber of the filter had a length of about 5.08 centimeters (2.0 inches) and a diameter of about 3.81 centimeters (1.5 inches), with an annular cylindrical bypass zone outside this diameter, and with varying amounts of kapok in the inner chamber. A filter device having generally between approximately four grams and six grams of kapok, illustratively such as approximately five grams of kapok, was found to provide effective filtering for this particular illustrative embodiment. In various embodiments using kapok, other amounts of kapok may also be advantageous either below or above the range of four grams and six grams. The inventors have for example experimentally confirmed effective filtering using sample sizes ranging between 1 and 10 grams of kapok in various embodiments, where the effectiveness may depend on factors such as the size and volume of the main interior section of the filter assembly, the packing density of the kapok in the dimensions of the filter, and the surface area of interaction between the kapok and the fluid, for example.

In this illustrative embodiment, filter assembly 230 also has a centrifuge 231 that includes a motor 235, a motor shaft 237, and a rotor 239. Centrifuge 231 serves as a form of a mechanical forcing component configured for exerting a force, in the form of a centrifugal action, on the first filter layer 220 toward the bypass zone 222 in this embodiment. In this way, centrifuge 231 forces oil-based substance or residue out of the first filter layer 220 and into the bypass zone 222 and the bypass outlet 236. This step of rotating the centrifuge 231 may be performed during a drain phase, when the oil-based residue captured by the first filter layer 220 may be drained away from the appliance. In this embodiment, motor 235 also serves as the drain motor for the dishwasher. Motor 235 can spin the rotor 239 and force oil-based substance out of the first filter layer 220 into the bypass zone 222 to be drained, such that centrifuge 231 shares structure with a standard drain motor already included in a typical dishwasher, and shares in the energy already consumed by performance of the drain cycle. In an illustrative embodiment, motor 235 may exert a centrifugal operation on the filter assembly with a rotational speed of, for example, 3,000 revolutions per minute for around two minutes. Other embodiments may use rotational speeds and time periods lower or higher than these example values.

A wide variety of shapes, formations, and mechanisms may be used for the oleophilic and hydrophobic filter layer, the fluid path across it, and the bypass zone or zones on opposing sides of it, in various embodiments. Other illustrative embodiments of filter assembly devices of the present disclosure are found in FIGS. 3-6. These figures illustrate exemplary embodiments of a filter assembly 30/30B (FIGS. 3 and 4), filter assembly 330 (FIG. 5), and filter assembly 430 (FIG. 6). Numerals having the latter two digits in common are used to identify at least somewhat analogous components as between FIGS. 1-7 (e.g., filter assembly 30 in FIGS. 3 and 4, filter assembly 130 in FIG. 1A, filter assembly 330 in FIG. 5, filter assembly 430 in FIG. 6, filter assembly 530 in FIG. 7). Noted further is that while each of the filter assembly devices 30, 130, 230, 330, 430, 530 may comprise different features, the configurations of each are not exclusive. That is, features found and discussed in connection with any one of these filter assembly devices may be used in connection with any of the others.

Figure 3:
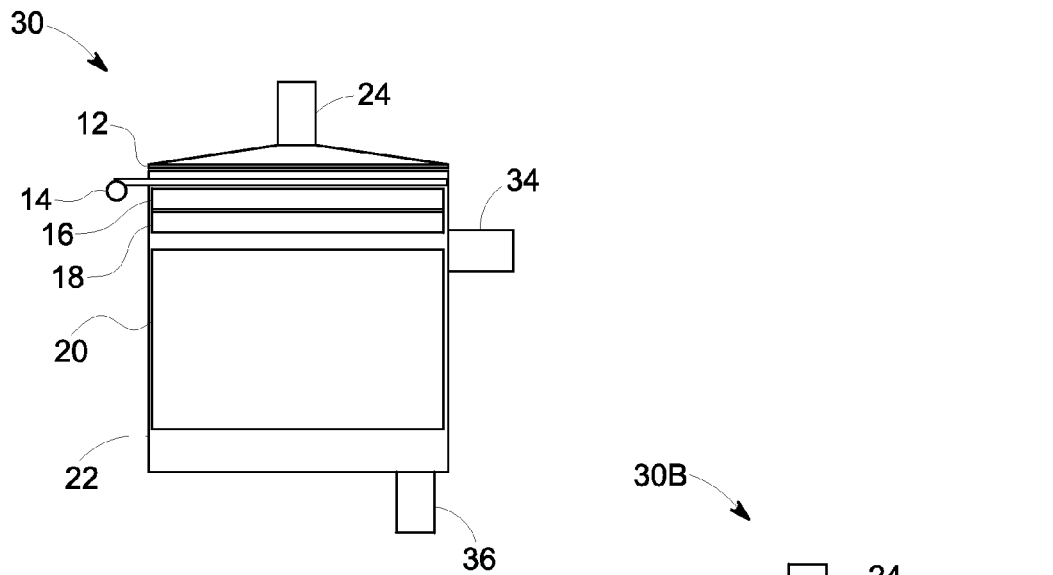
FIG. 3 is a side, cross-sectional view of an illustrative embodiment of a filter assembly.
Figure 4:
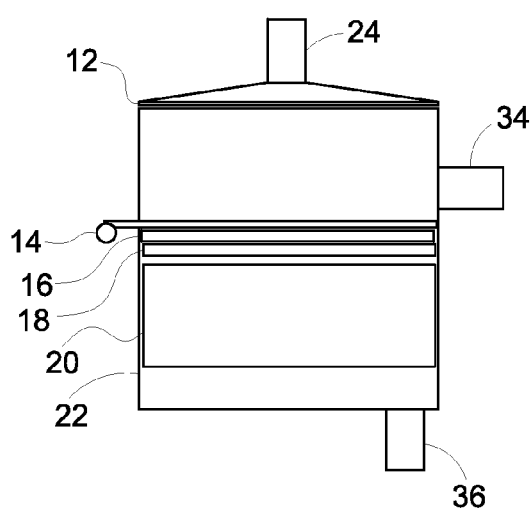
FIG. 4 is a side, cross-sectional view of the illustrative embodiment of a filter assembly of FIG. 3 in a different configuration.

FIG. 3 is a side, cross-sectional view of a filter assembly 30 in accordance with another illustrative embodiment. FIG. 4 is a side, cross-sectional view of the illustrative embodiment of a filter assembly 30 of FIG. 3 in a different configuration 30B. In FIG. 3, the filter assembly 30 includes filter inlet 24, a mesh layer 12, a squeezer 14, a first filter layer 16, a second filter layer 18, a third filter layer 20, a first outlet 34, a bypass zone 22, and a bypass outlet 36. Mesh layer 12 is therefore positioned between basin 108 (FIG. 1A) and the filter layers, including first filter layer 16, second filter layer 18, and third filter layer 20. Mesh layer 12 may illustratively be composed at least in part of nylon, polyester, stainless steel wire, or any other appropriate material, for example, and may serve to exclude macroscopic particulate matter from contacting the other filter layers in filter assembly 30, in this illustrative embodiment. Additional filter layers, filter components, and filters of various types may also be used elsewhere in an appliance, and may illustratively be positioned in series with filter assembly 30, either upstream or downstream in a fluid path from filter assembly 30, in various embodiments.

The filter layers may each be a different oleophilic and hydrophobic material. For example, in the illustrative embodiment of FIGS. 3 and 4, first filter layer 16 may be a fluorosilicone layer; second filter layer 18 may be a polyphylene sulphide layer; and third filter layer 20 may be a kapok layer. The polyphylene sulphide layer may also include polystyrene-coated polyphylene sulphide, for example. Each of these layers, in order, may contribute to various filtering effects, which may include adsorbing oil-based matter out from water-based fluids passing therethrough.

Squeezer 14 may serve as a mechanical forcing component for exerting a force on the filter layers 16, 18, and 20 in this illustrative embodiment. FIG. 3 shows filter assembly 30 with squeezer 14 in a relaxed configuration. FIG. 4 shows filter assembly 30B, the same embodiment as in FIG. 3, but with squeezer 14 in a compressive configuration, so that it is being pressed against the filter layers 16, 18, and 20. In this way, squeezer 14 may squeeze oil-based matter out of the filter layers and into the bypass zone 22 and the bypass outlet 36. This compression or other mechanical forcing step may be performed during a drain phase, when the oil-based residue captured by the filter layers may be drained away from the appliance. Squeezer 14 therefore serves as another form of forcing component configured for exerting force on the filter layers, comparable in this way to centrifuge 231 in the embodiment of FIG. 2. Squeezer 14 can be controlled by mechanical, hydraulic, electrical, or other means in different embodiments.

Many other types of mechanical forcing mechanisms may also be used to exert a force against the filter layers toward the bypass zone, such as centrifuge 231 of the embodiment of FIG. 2. In other embodiments, a filter assembly may be used without a mechanical forcing component.

In various embodiments, a mechanical forcing component may also be used in a filter assembly with fewer filter layers or filter materials, or only a single filter layer or filter material. For example, in an illustrative embodiment, a filter assembly may include only a single filter layer composed at least partly of kapok, and a squeezer, centrifuge, press, or other forcing component may be used to mechanically compress or exert force on the kapok filter material for extruding oil-based residue out of the kapok filter material during a drain phase at the end of a wash cycle, for example.

Squeezer 14 may also serve as a heat transference layer. Squeezer 14 is positioned between the basin 108 and the filter layers 16, 18, and 20, and may therefore serve to transfer heat away from incoming hot fluid from basin 108 (FIG. 1A) before it reaches filter layers 16, 18, and 20. In some illustrative embodiments, for example, third filter layer 20 is composed of kapok, and limiting the temperatures of fluids to which third filter layer 20 is exposed to increases the long-term performance of the kapok in third filter layer 20. A wide variety of other types of heat transference layers may also be used, which may be composed of or include a material with a usefully high heat conductance, illustratively such as copper, steel, or other metal, and which has a significant surface area of interaction with the bypassing fluid, and is connected to a significant heat sink outside the flow path of the heated fluid, such as a nearby copper or steel structural member or pipe, in some illustrative embodiments. Various forms of heat transference layers may thereby be configured for reducing a temperature of the bypassing fluid.

Other embodiments do not use a heat transference layer. For example, one illustrative embodiment uses other, more heat-resistant materials such as polyphylene sulphide instead of kapok, and does not use a heat transference layer. Various embodiments using a kapok filter may also be suitable without a heat transference layer, if other design factors ensure that the kapok is not exposed to excessively hot fluid, such as constraining the temperature of the fluid to levels safe for kapok before dispersal into basin 108.

Figure 5:
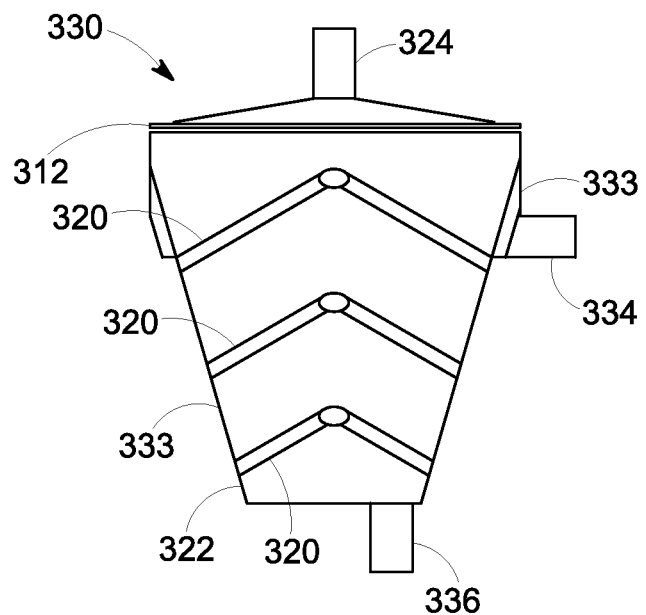
FIG. 5 is a side, cross-sectional view of an illustrative embodiment of a filter assembly.
Figure 6:
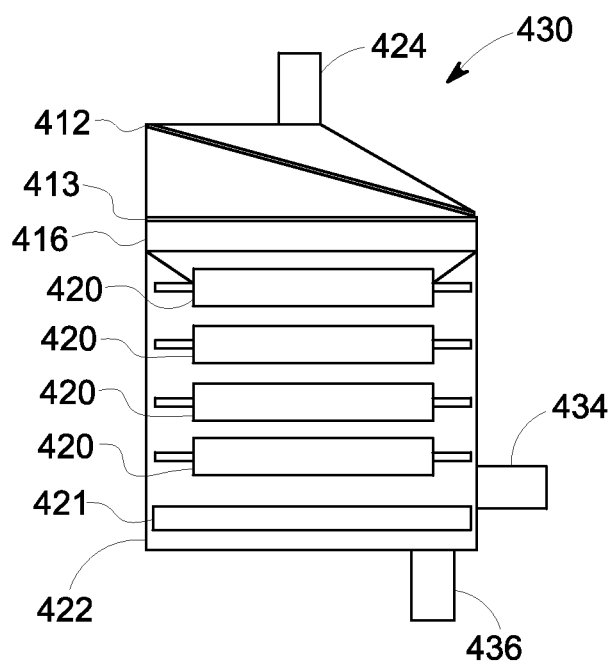
FIG. 6 is a side, cross-sectional view of an illustrative embodiment of a filter assembly.

FIG. 5 is a side, cross-sectional view of a filter assembly 330 in accordance with another illustrative embodiment, in which the filter assembly 330 further comprises a plurality of angled filter layers 320 disposed in an annular housing (not shown). Filter assembly 330 includes filter inlet 324, mesh layer 312, angled filter layers 320, an initial outlet 333, a downstream outlet 334, a bypass zone 322, and a bypass outlet 336. In one example, water-based fluids may run off of angled filter layers 320 into an open area between the outer circumference of the filters and the outer housing, where the fluids can enter initial outlet 333 and from there enter to downstream outlet 334, while oil-based residue matter may adsorb through angled filter layers 320 and collect into bypass zone 322 and into bypass outlet 336, in this illustrative embodiment. In variations on this embodiment, only a single angled filter layer 320 may be used, or two or three or four or any number of angled filter layers 320 may be used, and may be stacked in series, arranged partly or entirely adjacent or in parallel, or otherwise arranged for different flow and filtering effects in different applications.

FIG. 6 is a side, cross-sectional view of an illustrative embodiment of a filter assembly 430 in accordance with another illustrative embodiment, in which the filter assembly 430 further comprises one or more filter rollers 420 that may constitute additional filter layers. Filter assembly 430 includes filter inlet 424, first mesh layer 412, second mesh layer 413, first filter layer 416, filter rollers 420, second filter layer 421, first outlet 434, a bypass zone 422, and a bypass outlet 436. First filter layer 416 and second filter layer 421 are flat filter layers, as opposed to filter rollers 420, which have filter material disposed on rollers that may be rotated by incoming fluid, thereby providing more filter surface area the fluid is exposed to as it passes through the filter assembly 430. In one example, a plurality of the filter rollers 420 are aligned laterally across the filter assembly 430. In another the filter assembly 430 comprises an outer housing (not shown) that forms an opening wide enough for the diameter of one of the filter rollers 420. The filter rollers 420 can likewise be stacked to form a number of layers of filer roller 420 (each having one or more filter rollers) longitudinally along an axis of the filter assembly 430 as FIG. 6 illustrates.

Water-based fluids may run through first filter layer 416, past filter rollers 420, onto second filter layer 421, and into first outlet 434, while oil-based residue matter may adsorb into first filter layer 416, filter rollers 420, and second filter layer 421. In one example, oil-based residue that is not adsorbed may collect into bypass zone 422 and enter bypass outlet 336, which may for example be assisted by a squeezer or other mechanical forcing component compressing all the filter layers into bypass zone 422 and bypass outlet 436 at an end-stage drain phase, in this illustrative embodiment.

Filter rollers 420 may be useful for increasing the surface area of interaction between the bypassing fluid and the filter layers of the filter assembly, in various embodiments. Any of first filter layer 416, filter rollers 420, and second filter layer 421 may be composed of kapok or any other suitable filter material such as the other oleophilic and hydrophobic materials listed above, for example. In variations on this embodiment, filter rollers 420 may be used without filter layer 416 and/or second filter layer 421. In other variations on this embodiment, only a single filter roller 420 may be used, or two or three or four or any number of filter rollers 420 may be used, and may be stacked in series, and/or arranged partly or entirely adjacent or in parallel, or otherwise arranged for different flow and filtering effects in different applications.

Different types of mesh may usefully be applied with the first mesh layer 412 and second mesh layer 413 in various embodiments. For example, the first mesh layer 412 may have a larger pore size, and may illustratively have a pore size of greater than or equal to 0.2 millimeters, while the second mesh layer may have a pore size of less than or equal to 0.2 microns, as an illustrative example. Other types of mesh with a variety of pore sizes, either less than or greater than these examples, may also be used in various illustrative embodiments. Mesh layers may contribute to filtering, and/or may be used for structural or packaging functions with a filter layer.

Any combination of the filter layers of the illustrative embodiments of FIGS. 2-6, and/or any other formations, configurations, or variations on the elements disclosed therein, may be used in different embodiments.

The body of a filter assembly and/or other associated components of an appliance may illustratively be constructed using typical manufacturing techniques such as machining, turning, casting, extruding, and similar techniques for manipulating materials. Materials for use in the body of a filter assembly and/or other associated components can comprise aluminum, steel, stainless steel, as well as combinations and derivations of these and other thermally conductive materials.

The body of a filter assembly and/or other associated components of an appliance may illustratively be constructed monolithically as illustrated in the present example or from a plurality of pieces and components that are constructed and assembled together using fastening techniques such as welding and other fasteners compatible with the concepts disclosed herein. Multi-piece construction may permit the use of different materials and composites, therefore providing flexibility to tune the properties of the body or components. By way of example the body can comprise a first material such as aluminum, which may be machined so as to have the fluid conducting features incorporated therein. Tubing such as copper tubing or aluminum tubing can be pressed into the fluid conducting features thereafter creating fluid paths or surfaces through which the washing fluid may flow. In other constructions the body or components may illustratively be constructed from a composite or other combination of materials selected and combined so as to optimize the properties of the filter assembly and/or other associated components.

Figure 7:
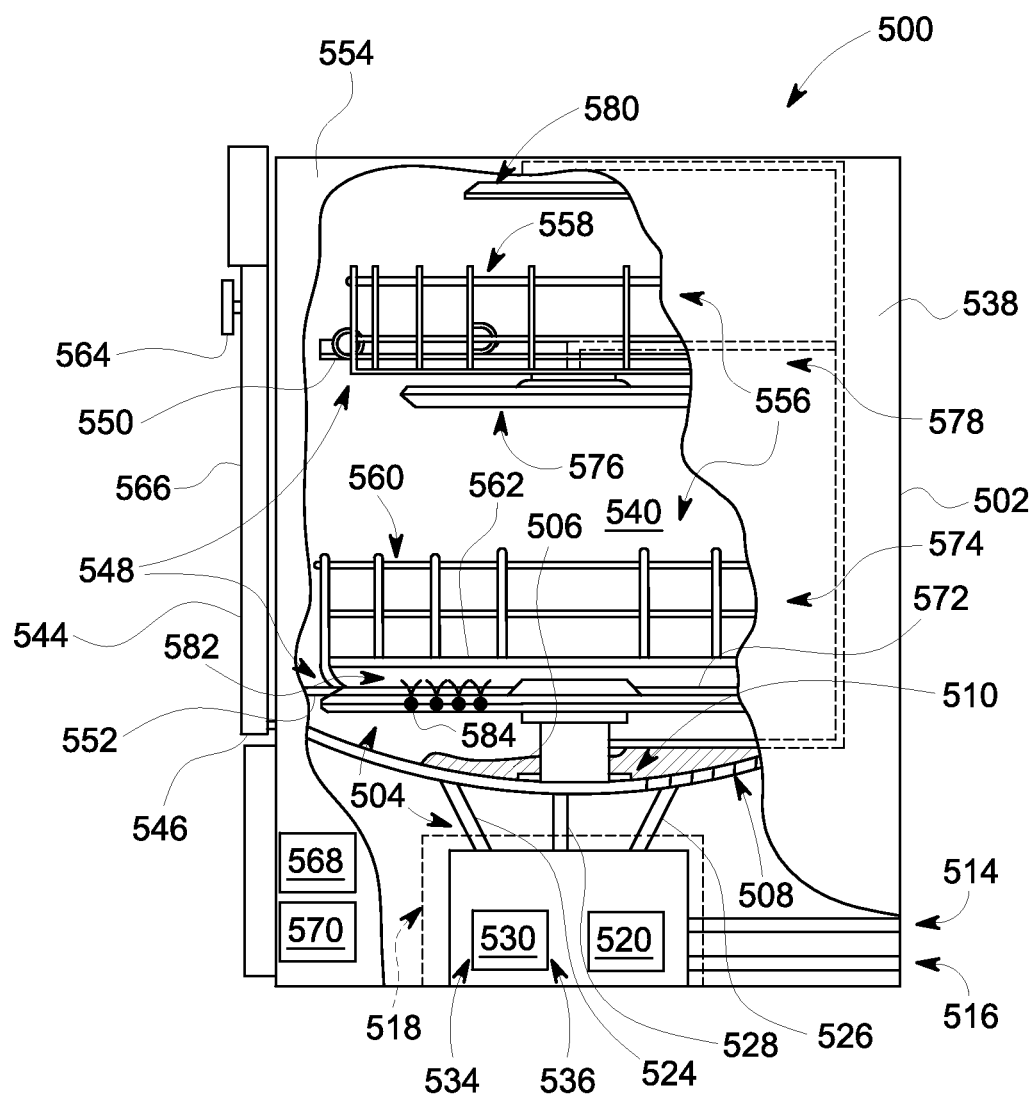
FIG. 7 is a side, partial cutaway, cross-sectional view of an illustrative embodiment of an appliance for washing objects having a filter assembly.

Though not shown in FIG. 1A or FIG. 7, various drain side openings and the inlet side openings may illustratively be configured such as with threads and/or threaded fasteners to facilitate coupling with, e.g., the conduit matrix 122 (FIG. 1A). Fittings such as pipe fittings and quick-release fittings can be implemented on or about the body of a filter assembly 130 and/or other associated components. These fittings permit the body to be inserted as, for example, a replacement part or upgrade to an existing appliance. In one example, the filter assembly 130 may fixedly secured as part of, e.g., the fluid distribution system 118 (FIG. 1A). Solder, adhesives, and related fastenings can be used to secure the filter assembly 130 in the appliance.

Feature configurations such as the shape and size of the bores and other openings and apertures may also vary among different embodiments. Manufacturability and cost, as well as performance characteristics such as fluid flow are illustrative factors that may be considered when selecting a particular embodiment for a particular need, application, or target market. Dimensions and configuration details of various elements and components, such as nominal bore diameters of fluid inlets, fluid conduits, and fluid outlets, may be selected from a wide range of options in different embodiments.

In view of the foregoing, and with reference now to FIG. 7, embodiments of the filtering assembly (such as illustrative filter assemblies 30, 130, 230, 330, 430, 530 of FIGS. 1-6) can be implemented in a variety of appliances, including dishwashers, clothes washers, and the like. In FIG. 7, there is depicted another exemplary embodiment of an appliance 500, which is shown as a side, partial cutaway view of a domestic dishwasher. Like reference numerals are used to identify at least somewhat analogous components as between the FIGS. 1 and 7, except that the reference numerals are different in the hundreds digit between the various figures.

FIG. 7 is a side, partial cutaway, cross-sectional view of an illustrative embodiment of an appliance 500 for washing objects having a filter assembly 530. By way of example, as depicted in FIG. 7, there is illustrated that the appliance 500 includes an enclosure 502, a spray system 504 for dispensing a fluid 506, and a heating element 510. A fluid inlet 514 provides a fluid 506. The appliance 500 also comprises a fluid outlet 516 and a fluid distribution system 518 with a pump 520. Spray system 504 is configured with a basin drain 524 and a basin inlet 526 that are coupled to the basin 508, and a spray inlet 528 coupled to the spray system 504. The appliance 500 is equipped with a filter assembly 530, which has a filter inlet 534 and a first outlet 536, where the filter inlet 534 is fluidly connected to the basin 508 via basin drain 524, and the first outlet 536 is fluidly connected to the pump 520 and to the fluid inlet 514 and fluid outlet 516.

In the illustrative example of FIG. 7, the enclosure 502 includes a cabinet 538 having a tub 540 therein and forming a wash chamber. The tub 540 includes a front opening (not shown in FIG. 7) and a door 544 with a hinged bottom portion 546 such as for movement between a normally closed vertical position (shown in FIG. 7) and a normally open horizontal position (not shown). As depicted in FIG. 7, the wash chamber is sealed shut in the closed position for washing operation. The open position is useful for loading and unloading of objects from the appliance 500.

Guide rails 548 including an upper guide rail 550 and a lower guide rail 552 are mounted on enclosure side walls 554. The guide rails 548 accommodate one or more racks 556 such as an upper rack 558 and a lower rack 560 (hereinafter, "the racks"), respectively. Each of the racks may be fabricated from various materials into lattice structures including a plurality of elongated members 562, and each may be adapted for movement between an extended loading position (not shown) in which at least a portion of the racks are positioned outside the wash chamber, and a retracted position (shown in FIG. 7) in which the rack is located inside the wash chamber. In one implementation, a silverware basket (not shown) may be removably attached to the lower rack 560 for placement of silverware, utensils, and the like that are too small to be accommodated by either one or both of the racks contemplated herein.

A control input selector 564 such as a keypad may be mounted at a convenient location on an outer face 566 of the door 544 and may be coupled to control circuitry, which in one example is coupled to a controller 568. The control input selector 564 may also be coupled to other control mechanisms (not shown) for operating, e.g., the pump 520 for circulating fluids such as fluid 506 in the tub 540. In one embodiment, the fluid distribution system 518 including the pump 520 may be located in a machinery compartment 570 located below the basin 508 of the tub 540.

Construction of the spray system 504 as provided in connection with the concepts of the present disclosure can vary. In various illustrative embodiments, the spray system 504 may include a lower spray-arm assembly 572, which is mounted for rotation within a lower region 574 of the wash chamber and above the basin 508 so as to rotate in relatively close proximity to the lower rack 560. In various illustrative embodiments, a mid-level spray-arm assembly 576 may be located in an upper region 578 of the wash chamber in close proximity to the upper rack 558. The mid-level spray-arm assembly 576 may be located at a height above the lower rack 560 sufficient to accommodate items such as a dish or platter (not shown) that is placed in lower rack 560. In various illustrative embodiments, an upper spray-arm assembly 580 may be located above the upper rack 558, again being located at a height sufficient to accommodate items expected to be placed in the upper rack 558, such as a glass (not shown) of a selected height.

One or more of the spray arm assemblies (e.g., the lower spray-arm assembly 572, the mid-level spray-arm assembly 576, and the upper spray-arm assembly 580) may be fed by the pump 520. Each of the spray arm assemblies may include discharge ports 582 such as one or more spray jets 584, which are effectively orifices for directing the fluid 106 onto objects (e.g., dishes) located in the racks. In various illustrative embodiments, the angle of the spray jets 584 may be fixed such as relative to the spray arm assembly. In various illustrative embodiments, the angle may vary, depending in part on the size of the wash chamber, the location of the spray arm assembly, and the number of racks, among many factors. In one particular construction of the appliance 500, one or more of the spray jets 584 is affixed at about a 10° angle relative to the spray arm assembly.

The arrangement of the spray jets 584 in the spray arm assemblies may result in a rotational force as fluid 106 flows through the spray jets 584. The resultant rotation of spray arm assemblies provides coverage of the objects with the fluid 506. In one embodiment, one or more of the spray arm assemblies is likewise configured to rotate, generating in one example a swirling spray pattern above and below, e.g., the upper rack 558 when the pump 520 is activated.

As an illustrative example of operating conditions, wash fluid may be provided to spray jets 584 at a pressure of around 2 pounds per square inch (PSI) and a temperature of around 140 to 160 degrees Fahrenheit, and a flow rate of around 12 to 13 gallons per minute. Any other operating conditions may also be used in different embodiments and applications, with pressures, temperatures, and flow rates each being higher or lower than the examples given here.

Figure 8:
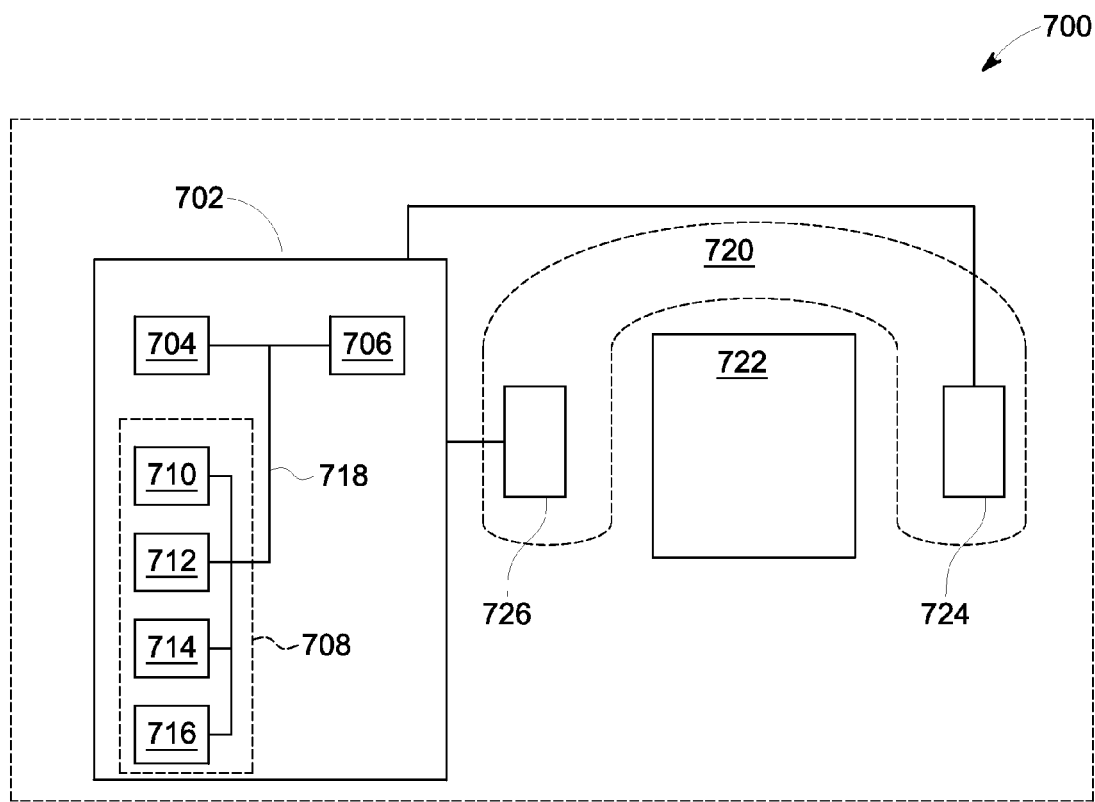
FIG. 8 is a schematic diagram of an illustrative embodiment of a control configuration for use with an appliance such as the appliances of FIGS. 1 and 7.
Figure 9:
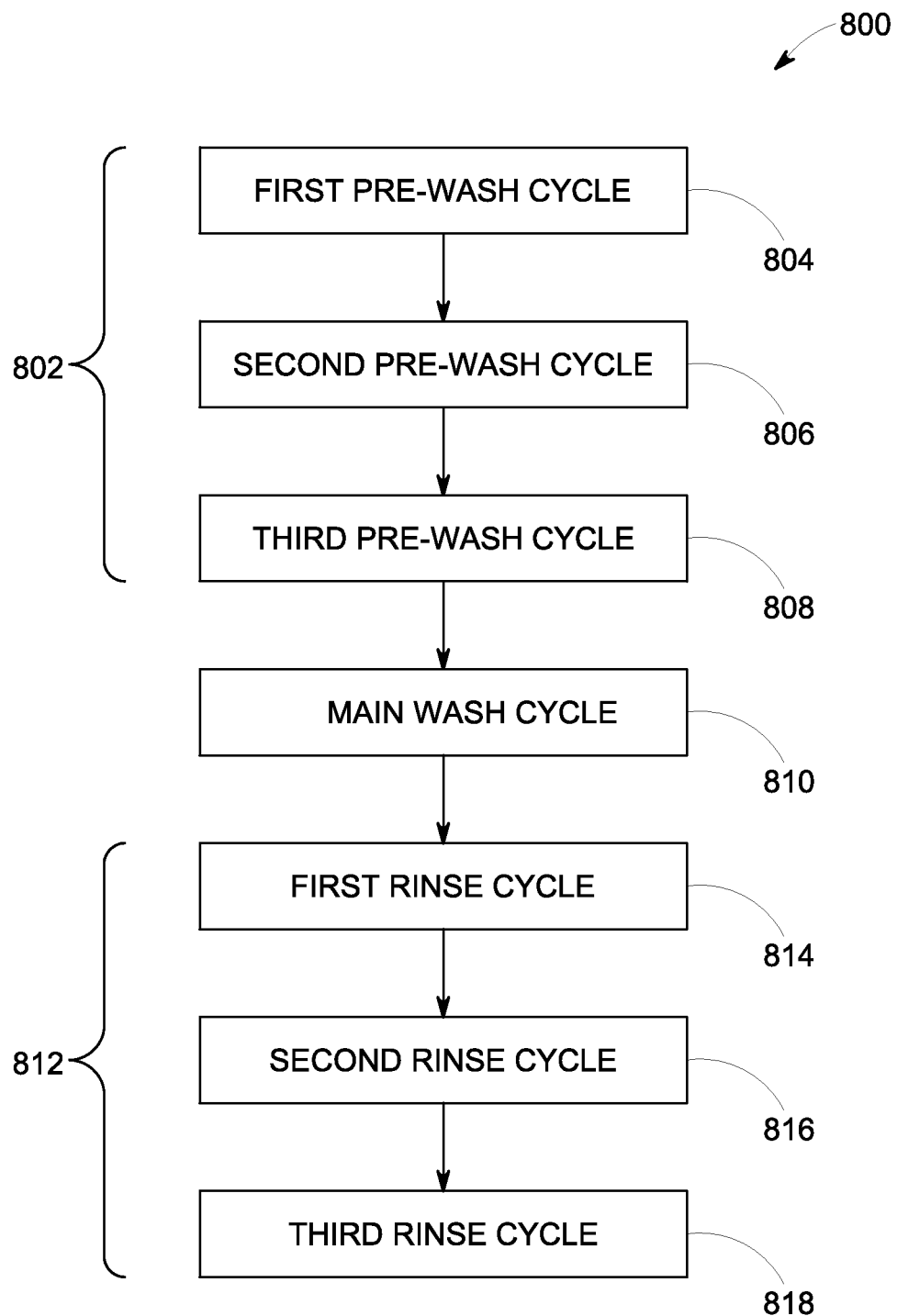
FIG. 9 is a flow diagram of an illustrative embodiment of an operational cycle for an appliance such as the appliances of FIGS. 1 and 7.

FIG. 8 is a schematic diagram of an illustrative embodiment of a control configuration for use with an appliance such as the appliances of FIGS. 1 and 7. FIG. 9 is a flow diagram of an illustrative embodiment of an operational cycle for an appliance such as the appliances of FIGS. 1 and 7. A variety of control configurations and schemes can be used to implement operation of the appliances, thereby effectuating the method 600 above and related operational cycles (e.g., an operational cycle 800 of FIG. 9 below). An example of the control structure and circuitry can be had with reference next to FIG. 8. The present example of FIG. 8 provides, in part, a schematic diagram of one configuration of a control scheme 700 for use in, e.g., the appliances 100 and 500 of FIGS. 1 and 7, as well as related embodiments ("the appliances").

The control scheme 700 includes a controller 702 (e.g., the controller 568 of FIG. 7), which includes a processor 704, a memory 706, and control circuitry 708 configured for general operation of the appliances. The control circuitry 708 may include a pump motor control circuit 710, a heater control circuit 712, a timing circuit 714, and a filter assembly control circuit 716. All of these components may be coupled together and communicate with one another via one or more busses 718. Also illustrated in the control scheme 700 is a flow control device 720, which is in fluid connection among between the filter assembly 722, an enclosure (e.g., the enclosure 102 and 502) and a fluid inlet (e.g., the appliance inlet 114 and the fluid inlet 514).

In use, the controller 702 controls operation of the flow control device 720 to control the flow of fluid into and out of the filter assembly 722. Similar flow control devices are used in the embodiment of FIG. 1A to control the flow of the fluid 106 into and out of the filter assembly 130, and in the embodiment of FIG. 7 to control the flow of the fluid 506 into and out of the filter assembly 530. The flow control device 720 has several operating modes, each of which defines a different configuration of the fluid distribution system. The flow control device 720 has a valve assembly 724 and a pump 726. For example, in one embodiment the fluid distribution system has a first configuration that permits fluid flow from the first outlet of the filter assembly to the basin, and a second configuration that permits fluid flow from both the first outlet and the bypass zone to the appliance outlet, such as in the flow configurations illustrated in FIGS. 1B and 1C. The valve assembly 724 includes one or more valves that open and close different flow paths to enable these flow configurations.

In the first configuration, the pump 726 is active and a valve is open from the first outlet of the filter assembly 722 to the pump 726. The pump 726 directs fluid from the first outlet of the filter assembly 722 into the spray system and the basin. At the same time, valves from both the first outlet and the bypass zone of the filter assembly 722 to the appliance outlet are closed.

The flow control device 720 also activates the fluid distribution system into a second configuration that permits fluid flow from both the first outlet and the bypass zone to the appliance outlet. In the second configuration, the valves from both the first outlet and the bypass zone of the filter assembly 722 to the appliance outlet are opened, and the valve from the first outlet of the filter assembly 722 to pump 726 is closed. In the second configuration, the pump 726 is inactive.

When implemented in an appliance, the controller 702 may be configured to execute an operational cycle (e.g., the operational cycle 800 in FIG. 9) that instructs the flow control device 720 to sequentially activate the first configuration, and later the second configuration. The timing circuit 714, of which various configurations are contemplated, may be provided to indicate times and time periods to, e.g., open and close valves in the valve assembly 724 and activate and inactivate the pump 726. These time periods may be selected, in connection with or wholly separate from the configuration of the filter assembly 722, to improve the filtering of the wash fluid by the filter assembly 722 according to various filtering parameters. Timing selections may in one example be implemented as part one or more of the wash cycles (e.g., a pre-wash portion 802, a main wash cycle 810, and a rinse portion 812 in FIG. 9).

Various illustrative embodiments of the controller 702 may include one or more groups of electrical circuits that are each configured to operate, separately or in conjunction with other electrical circuits, to selectively vary among other things the timing and operation of the fluid distribution system. The controller 702 and its constructive components are configured to communicate amongst themselves and/or with other circuits (and/or devices), which may execute high-level logic functions, algorithms, as well as firmware and software instructions. Exemplary circuits of this type include, but are not limited to, discrete elements such as resistors, transistors, diodes, switches, and capacitors, as well as microprocessors and other logic devices such as field programmable gate arrays ("FPGAs"), application specific integrated circuits ("ASICs"), and/or central processing units ("CPUs"). The discrete elements, circuits, and devices may perform various functions individually, and their combination and integration into functional electrical groups and circuits may generally further contribute to novel and advantageous features.

In various illustrative embodiments, the electrical circuits of the controller 702 may be implemented in a manner that can physically manifest logical operations, which are useful to facilitate the various flow control operations such as opening and closing the valve assembly 724 and pump 726. These electrical circuits can replicate in physical form an algorithm, a comparative analysis, and/or a decisional logic tree, each of which operates to assign the output and/or a value to the output that correctly reflects one or more of the nature, content, and origin of the changes that occur and that are reflected by the relative inputs to the valve assembly 724 and pump 726.

In various illustrative embodiments, the processor 704 may be a central processing unit (CPU), an ASIC, and/or an FPGA that is configured to the control operation of the flow control device 720. The processor 704 can also include state machine circuitry or other suitable components capable of controlling operation of, e.g., pump 120 or pump 520 as described herein. The memory 706 may include volatile and non-volatile memory and may be used for storage of software (or firmware) instructions and configuration settings. In various illustrative embodiments, each of the pump motor control circuit 710, the heater control circuit 712, the timing circuit 714, and/or the filter assembly control circuit 716 may be embodied as stand-alone devices such as solid-state devices. These devices can be mounted to substrates such as printed-circuit boards, which may accommodate various components including the processor 704, the memory 706, and other related circuitry to facilitate operation of the controller 702 in connection with its implementation in the appliances 100 and 500.

While the illustrative embodiment of FIG. 8 shows the processor 704, the memory 706, the a pump motor control circuit 710, a heater control circuit 712, and a timing circuit 714, and the filter assembly control circuit 716 as discrete circuitry and combinations of discrete components, this may not be the case in various other illustrative embodiments. For example, one or more of these components may be contained in a single integrated circuit (IC) or other component. As another example, the processor 704 can include internal program memory such as RAM and/or ROM. Similarly, any one or more of functions of these components may be distributed across additional components (e.g., multiple processors or other components) in various illustrative embodiments.

Operation of the appliances and implementation of the methods contemplated herein may be incorporated into one or more different operational cycles. One example of an operational cycle is illustrated in FIG. 9, in which there is depicted an example of an operational cycle 800. The operational cycle 800 can be implemented on the appliances 100 and 500 ("the appliances"). Typically, the appliances employ a series of wash cycles, which include pre-wash, wash, and rinse cycles having a preset operation time for washing the objects.

In the illustrated embodiment, the operational cycle 800 includes a pre-wash portion 802 that is effectuated by a first pre-wash cycle 804, a second pre-wash cycle 806, and a third pre-wash cycle 808. The pre-wash portion 802 is used to remove loose particles from the dishes. Further, the operational cycle 800 includes a main wash cycle 810 for washing the dishes. In addition, the operational cycle 800 includes a rinse portion 812, including in this example a first rinse cycle 814, a second rinse cycle 816, and a third rinse cycle 818.

The inventors have experimentally tested the amounts of oils and grease in fluid cycling out of a dishwasher basin, both with and without an embodiment of a filter assembly of the present disclosure, at the end of each of a series of pre-wash, main wash, and rinse cycles, and have found that the amount of oils and grease in the fluid is greatly reduced with the use of a filter assembly as described herein, after the first pre-wash cycle 804, and is further reduced in successive cycles of operational cycle 800.

A drain cycle or drain phase may also be included, corresponding to the second configuration discussed above and depicted in FIG. 1C. A drain cycle can for example take place after the first pre-wash cycle 804, the main wash cycle 810 or the third rinse cycle 818, in various illustrative embodiments. This drain phase may include the fluid distribution system of the appliance switching from a first configuration that permits fluid flow from the first outlet to the basin, as shown in FIG. 1B, to a second configuration as shown in FIG. 1C that permits fluid flow from both the first outlet, such as the first outlet 234 in FIG. 2, and the bypass zone, such as the bypass zone 236 in FIG. 2, to the appliance outlet, such as the appliance outlet 116 in FIG. 1A. In this way, the drain phase may empty the oil-based residue from the bypass zone and bypass outlet straight through the appliance outlet and out of the appliance.

The second configuration may also be preceded by a centrifuge, squeezer, or other mechanical forcing component forcing oil-based residue out of any or all applicable filter materials or filter layers into the bypass zone and/or bypass outlet, to promote clearance of the filter layers of oil-based residues and renewal of the filter layers for subsequent washes. For example, the centrifuge 231 of FIG. 2 forces oil-based residue out of first filter layer 220, and the squeezer 14 of FIGS. 3 and 4 forces oil-based residue out of filter layers 16, 18, and 20. A single filter assembly can be used for a large number of washes, such as hundreds of washes, before significant degradation of the filter layers within. Eventual replacement of the filter layers or filter assembly may be useful in some embodiments for maintaining the filtering effectiveness of the filter assembly.

It is contemplated that numerical values, as well as other values that are recited herein are modified by the term "about", whether expressly stated or inherently derived by the discussion of the present disclosure. As used herein, the term "about" may define the numerical boundaries of the modified values so as to include, but not be limited to, tolerances and values up to, and including the numerical value so modified. That is, numerical values illustratively can include the actual value that is expressly stated, as well as other values that are, or can be, the decimal, fractional, or other multiple of the actual value indicated, and/or described in the disclosure. Numerical values may illustratively vary according to nominal tolerances and/or margins understood by those in the relevant field to be approximately typical.

This written description uses examples to disclose illustrative embodiments of the invention, including the best mode, and also to enable any person skilled in the art to practice the invention, including making and using any devices or systems and performing any incorporated methods. The patentable scope of the invention is defined only by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An appliance, comprising:
    an enclosure comprising a basin;
    a filter assembly in fluid connection with the basin; and
    a fluid distribution system in fluid connection with the basin, the filter assembly, and an appliance outlet,
    wherein the filter assembly comprises:
        a first filter layer that is both oleophilic and hydrophobic,
        a heat transference layer positioned between the basin and the first filter layer, the heat transference layer coupled to a heat sink, wherein the heat sink is located outside the flow path of the heated fluid,
        a first outlet in fluid connection with the first filter layer, the basin, and the appliance outlet, and
        a bypass zone in fluid connection with the first filter layer and the appliance outlet,
        wherein the heat transference layer is configured to reduce a temperature of a fluid entering the filter assembly before the fluid reaches the first filter layer.

2. An appliance according to claim 1, wherein the fluid distribution system has a first configuration that permits fluid flow from the first outlet to the basin, and a second configuration that permits fluid flow from both the first outlet and the bypass zone to the appliance outlet.

3. An appliance according to claim 2, further comprising a controller, wherein the controller is configured to control the fluid distribution system to enter the first configuration during a wash cycle, and to enter the second configuration during a drain cycle, wherein the first configuration permits fluid flow from the first outlet to the basin, and the second configuration permits fluid flow from both the first outlet and the bypass zone to the appliance outlet.

4. An appliance according to claim 1, wherein the filter assembly is in fluid connection with the basin via a filter inlet, the first outlet is in fluid connection with the filter inlet in a fluid path that passes across the first filter layer, and the bypass zone is in fluid connection with the filter inlet in a fluid path that passes through the first filter layer.

5. An appliance according to claim 1, wherein the filter assembly further comprises a forcing component configured for exerting force on the first filter layer, toward the bypass zone.

6. An appliance according to claim 5, wherein the forcing component comprises a squeezer.

7. An appliance according to claim 5, wherein the forcing component comprises a centrifuge.

8. An appliance according to claim 1, wherein the first filter layer further comprises at least one of polyphylene sulphide, fluorosilicone, and polystyrene.

9. An appliance according to claim 1, wherein the filter assembly further comprises a mesh layer between the basin and the first filter layer.

10. An appliance according to claim 9, wherein the mesh layer is composed at least in part of nylon.

11. An appliance according to claim 9, wherein the mesh layer comprises a first mesh layer with a pore size of greater than or equal to 0.2 millimeters, and a second mesh layer with a pore size of less than or equal to 0.2 microns.

12. An appliance according to claim 9, wherein the first filter layer comprises a kapok layer and at least one of a fluorosilicone layer, a polyphylene sulphide layer, and a polystyrene-coated polyphylene sulphide layer, positioned between the mesh layer and the kapok layer.

13. An appliance according to claim 1, further comprising a drain chamber in fluid communication with the basin, wherein the filter assembly is positioned in the drain chamber.

14. An appliance according to claim 1, wherein the first filter layer is among a plurality of filter layers, and at least one of the filter layers is an angled filter layer.

15. An appliance, comprising:
an enclosure comprising a basin;
a drain chamber positioned below the basin and in fluid connection with the basin;
a filter assembly positioned in the drain chamber, wherein the filter assembly comprises:
a filter inlet in fluid connection with the basin,
a first filter layer in fluid connection with the filter inlet, wherein the first filter layer is both oleophilic and hydrophobic and has a first side and a second side,
a heat transference layer positioned between the basin and the first filter layer, the heat transference layer coupled to a heat sink, wherein the heat sink is located outside the flow path of the heated fluid,
a first outlet in fluid connection with the first side of the filter layer,
a bypass zone in fluid connection with the second side of the filter layer, and
a forcing component for exerting force on the first filter layer toward the bypass zone;
a fluid distribution system in fluid connection with the basin, the filter assembly, and an appliance outlet, wherein the fluid distribution system has a first configuration that prevents fluid flow out of the bypass zone and permits fluid flow from the first outlet to the basin, and a second configuration that permits fluid flow from both the first outlet and the bypass zone to the appliance outlet; and
a controller configured to control the fluid distribution system to enter the first configuration during a wash cycle, and to enter the second configuration during a drain cycle.

16. An appliance according to claim 15, further comprising a mesh layer positioned between the filter inlet and the first filter layer.

17. An appliance according to claim 16, wherein the first filter layer comprises a kapok filter layer, and the appliance further comprises a polyphylene sulphide layer positioned between the mesh layer and the kapok filter layer.

18. An appliance according to claim 17, further comprising a fluorosilicone layer positioned between the mesh layer and the polyphylene sulphide layer.

* * * * *